(12) United States Patent
Li et al.

(10) Patent No.: US 8,826,649 B2
(45) Date of Patent: Sep. 9, 2014

(54) ASSEMBLY FOR MIXING LIQUID WITHIN GAS FLOW

(75) Inventors: Jianwen Li, West Bloomfield, MI (US); James B. Rodgers, Clarkston, MI (US); Chijou Wang, Farmington Hills, MI (US); Rahul Mital, Rochester Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 170 days.

(21) Appl. No.: 13/275,546

(22) Filed: Oct. 18, 2011

(65) Prior Publication Data

US 2013/0091830 A1  Apr. 18, 2013

(51) Int. Cl.
 *F01N 3/00* (2006.01)
 *F01N 3/28* (2006.01)
 *B01F 3/04* (2006.01)
 *B01F 5/06* (2006.01)

(52) U.S. Cl.
 CPC .......... *F01N 3/2892* (2013.01); *F01N 2240/20* (2013.01); *B01F 3/04049* (2013.01); *B01F 5/0616* (2013.01); *B01F 5/0618* (2013.01); *B01F 2005/0637* (2013.01)
 USPC ............... 60/295; 60/274; 60/301; 261/79.2; 138/37; 138/39; 366/330.4

(58) Field of Classification Search
 CPC . F01N 3/2892; F01N 2240/20; B01F 5/0618; B01F 3/04049; B01F 5/0616; B01F 2005/0637
 USPC ................ 60/274–324; 261/79.2; 138/37, 39; 366/197, 330.4, 336–39
 See application file for complete search history.

(56) References Cited

U.S. PATENT DOCUMENTS

| | | | | |
|---|---|---|---|---|
| 1,974,110 | A * | 9/1934 | Higley | 138/39 |
| 3,470,913 | A * | 10/1969 | Booy | 138/37 |
| 4,109,753 | A * | 8/1978 | Lyman | 181/252 |
| 4,848,920 | A * | 7/1989 | Heathe et al. | 366/339 |
| 6,745,562 | B2 * | 6/2004 | Berriman et al. | 60/324 |
| 7,543,561 | B2 * | 6/2009 | Shibata et al. | 123/306 |
| 7,797,937 | B2 * | 9/2010 | Endicott et al. | 60/605.1 |
| 7,954,514 | B2 * | 6/2011 | Tung et al. | 138/37 |
| 8,141,353 | B2 * | 3/2012 | Zheng et al. | 60/324 |
| 8,572,949 | B2 * | 11/2013 | Wirth | 60/286 |
| 2007/0144158 | A1 * | 6/2007 | Girard et al. | 60/324 |
| 2007/0245718 | A1 | 10/2007 | Cheng et al. | |
| 2008/0184700 | A1 * | 8/2008 | Harrer | 60/295 |
| 2009/0019843 | A1 * | 1/2009 | Levin et al. | 60/303 |
| 2009/0165447 | A1 * | 7/2009 | Hiranuma et al. | 60/295 |
| 2009/0266064 | A1 * | 10/2009 | Zheng et al. | 60/317 |
| 2011/0214415 | A1 | 9/2011 | Thomas | |

* cited by examiner

*Primary Examiner* — Jesse Bogue
(74) *Attorney, Agent, or Firm* — Quinn Law Group, PLLC

(57) ABSTRACT

An assembly for mixing liquid within a gas flow includes a hollow conduit that is configured for containing a flow of gas and liquid droplets. The assembly also includes multiple spaced blades and an impingement element. Each of the blades is operatively connected to and extends from the impingement element and is connected to an inner wall of the conduit. The impingement element is upstream of the blades in the flow of gas. The impingement element and the blades are configured to create a preferred distribution of the liquid droplets within the gas flow downstream of the blades within the conduit.

12 Claims, 4 Drawing Sheets

US 8,826,649 B2

ASSEMBLY FOR MIXING LIQUID WITHIN GAS FLOW

TECHNICAL FIELD

The invention relates to an assembly for mixing liquid within gas flow, such as for a vehicle exhaust treatment system or a fuel intake system.

BACKGROUND

Certain vehicle systems include the transport of liquid droplets within a flow of gas, such as in a vehicle exhaust treatment system or an engine fuel intake system. Controlled dispersion of the liquid droplets within the flow may be advantageous for several reasons. For example, in one type of vehicle exhaust system, liquid hydrocarbons (HC) are injected within a gas flow to a diesel oxidation catalyst (DOC) that is upstream of a diesel particulate filter (DPF). The hydrocarbon is oxidized in the DOC in an exothermic reaction, creating the high temperatures necessary in the downstream DPF for burning diesel particulate, thus burning off the particulate to regenerate the DPF and reduce system backpressure. In another example, a diesel exhaust fluid, such as urea or another liquid reductant of oxides of nitrogen ($NO_x$), is injected upstream of a catalyst, such as a selective catalyst reduction (SCR) catalyst, where it is converted to ammonia that is used to reduce $No_x$ to nitrogen ($N_2$). In another example, hydrocarbons are periodically injected into the exhaust flow upstream of a lean $No_x$ trap to regenerate the trap. In an engine fuel intake system as well, liquid fuel is entrained in air flow for combustion in the engine cylinders.

SUMMARY

An improved mixture assembly achieves a desired disbursement of liquid droplets downstream of the mixer assembly, thus improving operation of a vehicle component that processes the droplets, such as a diesel oxidation catalyst (DOC) and a diesel particulate filter (DPF) downstream thereof, a selective catalyst reduction (SCR) catalyst, of a lean $No_x$ trap, or an engine where combustion occurs.

An assembly for mixing liquid within a flow of gas includes a hollow conduit that has an inner wall and is configured for containing a flow of gas with liquid droplets. The assembly also includes multiple spaced blades and an impingement element. Each of the blades is operatively connected to and extends from the impingement element and is connected to the inner wall of the conduit. The impingement element is upstream of the spaced blades in the flow of gas. The impingement element and the blades direct the liquid droplets to create a preferred distribution of the liquid droplets within the gas flow. For example, the impingement element and the blades may be directed toward an outer annular region of the flow of gas within the conduit and may create a turbulent flow in the outer annular region. In other embodiments, the impingement element and the blades may create a substantially uniform distribution of the liquid droplets in the downstream gas flow. When the assembly is used upstream of a DOC and a DPF, a radial temperature differential in the DPF may be reduced, thus potentially improving regeneration efficiency. When the assembly is used upstream of an SCR catalyst or a lean $No_x$ trap, the ability to reduce $No_x$ may be improved. Likewise, if the mixer assembly is used upstream of engine fuel intake, improved mixing of fuel and air may improve engine combustion.

The above features and advantages and other features and advantages of the claimed invention are readily apparent from the following detailed description of the best modes for carrying out the claimed invention when taken in connection with the accompanying drawings.

DETAILED DESCRIPTION

Figure 1:
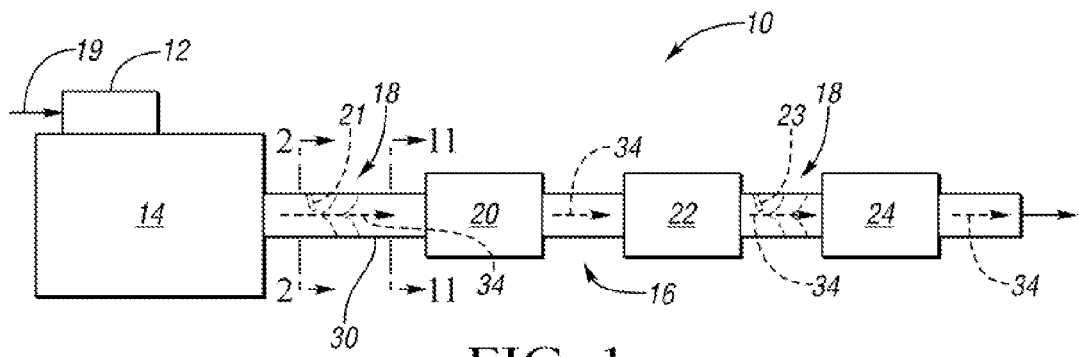
FIG. 1 is a schematic illustration of a portion of a vehicle showing air flow into a fuel intake system of an engine and flow through an exhaust system.

Referring to the drawings, wherein like reference numbers refer to like components throughout the several views, FIG. 1 shows a portion of a vehicle 10 having an air and fuel intake system 12 for an engine 14 and an exhaust system 16. A mixer assembly 18 is included for improving mixing of liquid within exhaust flow as explained herein. The mixer assembly

Figure 2:
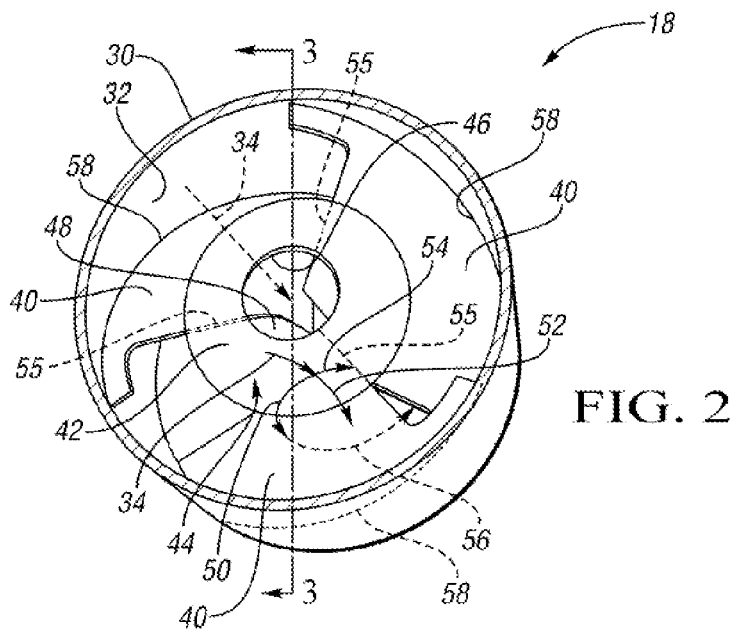
FIG. 2 is schematic perspective and partially cross-sectional illustration of a mixer assembly mounted within a conduit of the exhaust system taken at the lines 2-2 of FIG. 1.

18 is shown in greater detail in FIG. 2. The specific benefits of the structure of the mixer assembly 18 are discussed herein. Although shown in the exhaust system 16, the mixer assembly 18 may also be used in the engine air and fuel intake system 12 to affect the mixing of injected liquid fuel in the air flow 19 to improve combustion within cylinders of the engine 14.

The exhaust system 16 includes a diesel oxidation catalyst (DOC) 20, located downstream of the mixer assembly 18 in the flow of exhaust gas. A liquid injector 21, such as for injecting hydrocarbon fuel, is injected upstream of the mixer assembly 18. A diesel particulate filter (DPF) 22 is located further downstream of the DOC 20 in the flow of exhaust gas. Another component 24 such as a selective catalyst reduction (SCR) catalyst is located downstream of the DPF 22 and downstream of an injector 23, such as a urea injector. Alternatively, the component 24 may be a lean $No_x$ trap and the injector 23 may be a fuel injector to inject hydrocarbons to regenerate the lean $No_x$ trap. The component 24 converts at least some of the oxides of nitrogen ($No_x$) in the exhaust flow into nitrogen and water. Another mixer assembly 18 is configured to create a preferred distribution of liquid droplets (urea or hydrocarbon) in the gas flow to the component 24. The preferred distribution for an SCR or a lean $No_x$ trap may be a uniform distribution across the conduit 30 in the gas flow. In still other embodiments where the component 24 is an SCR catalyst, the component 24 could be located between the engine 14 and the DOC 20, or the exhaust system 16 could have a DOC 20 and DPF 22 but no SCR catalyst.

Referring to FIG. 2, the mixer assembly 18 is shown in greater detail. The mixer assembly 18 includes a conduit 30, which is an exhaust pipe or is inserted in line with an exhaust pipe on the vehicle 10. The conduit 30 has an inner wall 32 and encloses a flow of gas indicated by arrows 34 in FIG. 1 along with injected liquid droplets 36 carried in the flow of gas 34 and illustrated in FIG. 11.

The mixer assembly 18 includes multiple spaced blades 40. In the embodiment of FIG. 2, the mixer assembly 18 has three spaced blades 40. Each of the blades 40 is connected to and extends downstream in the exhaust flow from an impingement element 42. Each of the blades 40 is connected to the inner wall 32 of the conduit 30. Each of the blades 40 is also connected to the impingement element 42 so that the impingement element 42 is supported by the blades 40 and is generally centered within the conduit 30. In other embodiments, the impingement element 42 need not be centered by the blades but could instead be supported at another position within the conduit 30, including an off-center position or an angled position with respect to the axis of the conduit 30. The position of the impingement element 42 within the conduit 30 depends on the location of the injector 21 or 23 relative to the impingement element 42 and the blades 40, and the desired distribution of liquid droplets 36 in the gas flow 34 downstream of the blades 40.

Each blade 40 is connected to an underside (downstream side) of the impingement element 42 generally at an inner edge represented as 55 for each blade 40. Each blade 40 has a generally helical shape, so that it extends downstream in the conduit 30 in a spiral, with an outer edge 58 of each blade 40 secured to the inner wall 32 (outer edges 58 of only two of the blades 40 visible in FIG. 2 and outer edge 58 of the third blade 40 represented with a hidden line). The outer edge 58, therefore, has an arcuate shape so that it creates a spiraling pattern at the interface of the edge 58 and the inner wall 32. This spiraling pattern is illustrated as a hidden line indicating the hidden edge 58 of the lower-most blade in FIG. 2.

Figure 3:
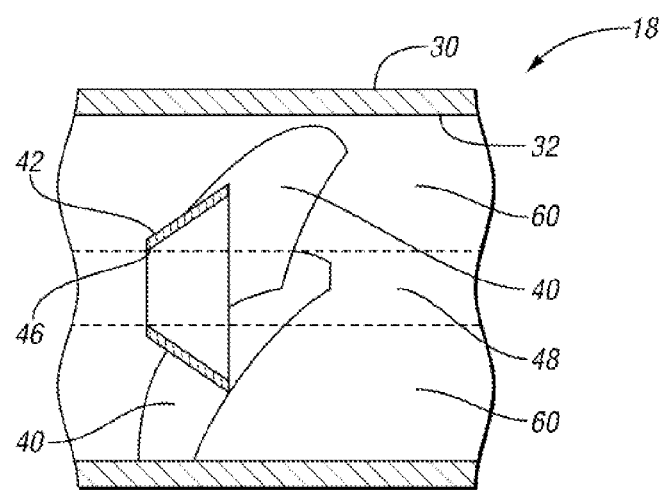
FIG. 3 is a schematic illustration in fragmentary cross-sectional view of the conduit and mixer assembly of FIG. 2 taken at the lines 3-3 in FIG. 2.

The impingement element 42 is upstream of the blades 40 in the exhaust flow 34 of FIG. 1. In the embodiment of FIG. 2, the impingement element 42 has a generally cone-shaped surface 44 that faces the direction of the flow of gas 34 and tapers outward within the conduit 30 in a downstream direction; that is, the cone-shaped surface 44 points generally upstream. In other embodiments, the impingement element 42 could instead be a plate with a flat surface facing the flow of gas 34. Also in the embodiment of FIG. 2, the impingement element 42 has a generally central opening 46. The central opening 46 allows a portion of the flow of gas 34 to flow through an axial flow region or center region 48 in the conduit 30. The axial flow region 48 is unobstructed by the blades 40, as indicated in FIG. 3. Portions of the flow of gas that are directed at the cone-shaped surface 44 will impact the surface 44 and thereby be at least partially redirected in order to flow past the impingement element 42. In FIG. 2, one such portion of the flow of gas 34 is shown impacting the impingement element 42 and dispersing into several different flow directions 50, 52, and 54. The arrows 50, 52, 54 also represent the breaking apart of a droplet of fluid carried in the flow of gas 34. One function of the impingement element 42 is to break apart fluid droplets when they impinge on the impingement element 42. The broken apart fluid droplets are dispersed through flow carried along the blades 42 in a swirling motion, as illustrated by arrow 56, creating turbulent flow in an outer annular region 60 (shown in FIG. 3) of the area inside the conduit 30, that surrounds the center region 48 in which there is generally axial flow.

Figure 10:
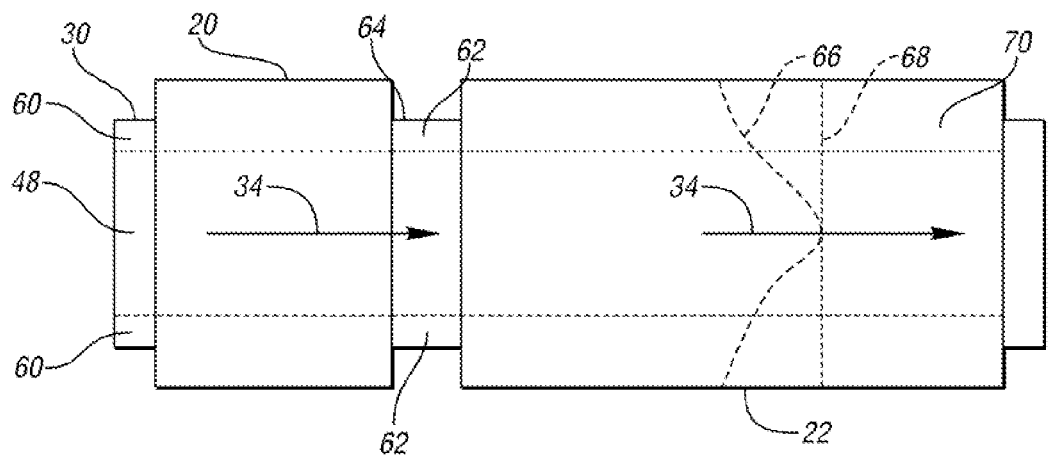
FIG. 10 is a schematic illustration of a diesel oxidation catalyst and a diesel particulate filter.
Figure 11:
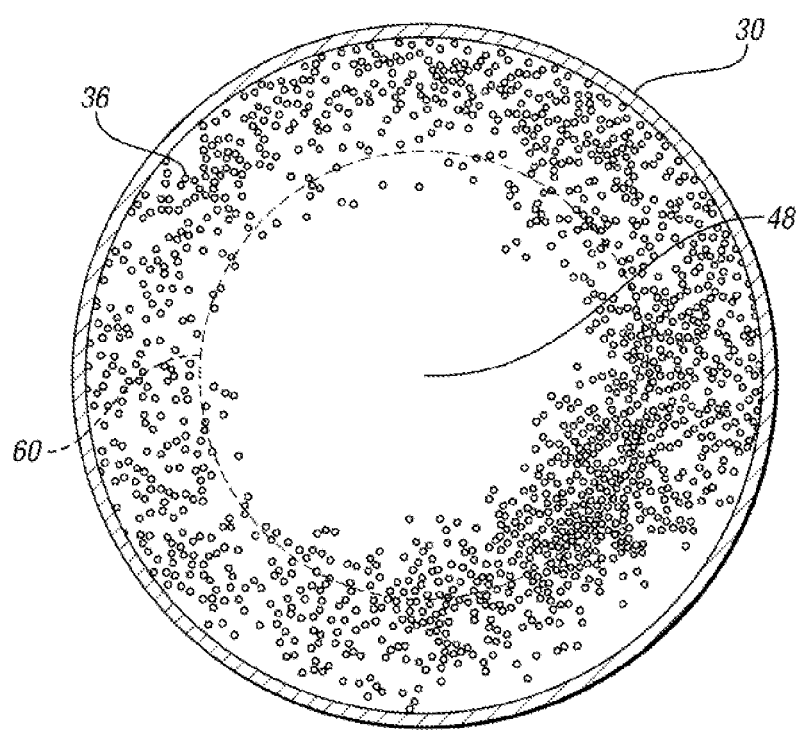
FIG. 11 is a schematic cross-sectional illustration of the conduit showing exhaust flow downstream of the mixer assembly and upstream of the diesel oxidation catalyst of FIG. 1 taken at the lines 11-11 in FIG. 1, illustrating an increased distribution of hydrocarbons in an outer annular region of the conduit.
Figure 12:
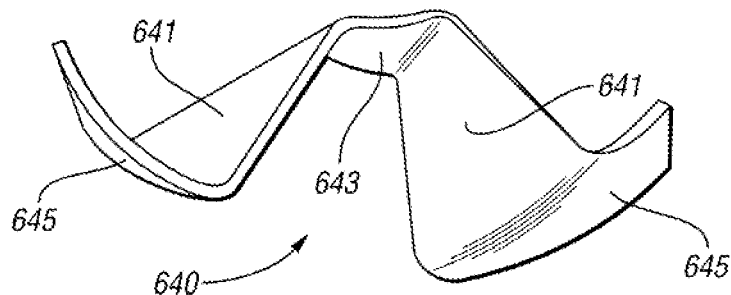
FIG. 12 is a schematic perspective illustration of a blade module having two blades connected at an inner periphery.
Figure 13:
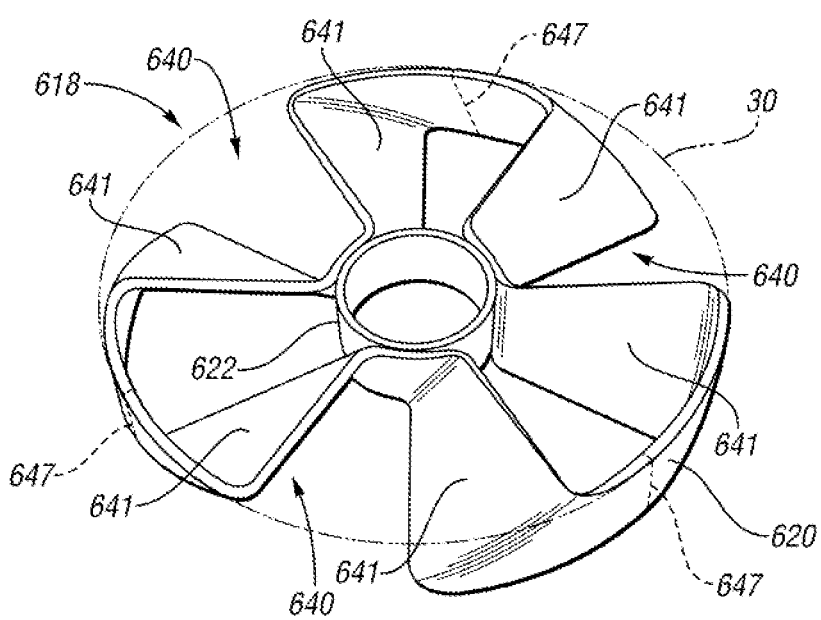
FIG. 13 is a schematic illustration of three of the blade modules of FIG. 12 welded to one another at outer peripheries and having a tubular portion at a center of the blade modules.
Figure 14:
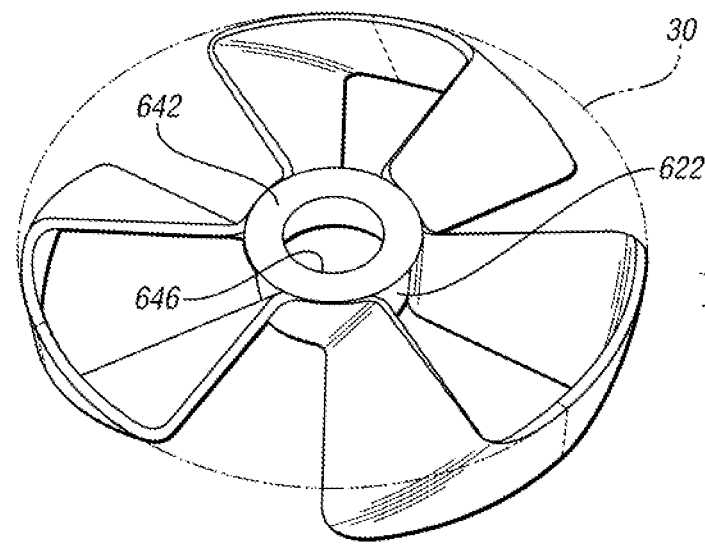
FIG. 14 is a schematic illustration of the blade modules and tubular portion of FIG. 13 with an impingement element with an opening positioned on an upstream side of the tubular portion to deflect flow to the blades.

Referring to FIG. 11, the dispersed liquid droplets 36 are carried in the exhaust flow downstream of the mixer assembly 18 with a majority being in the outer annular region 60 of the gas flow rather than the central region 48. This ability to direct the liquid to the outer annular region may be referred to as stratification of the liquid droplets. Accordingly, in an embodiment in which the liquid droplets are hydrocarbons, because burning of the hydrocarbons in the DOC 20 is an exothermic reaction, gas flow downstream to the DPF 22 will have higher temperatures in an outer annular region 62 of the conduit 64 between the DOC 20 and the DPF 22, shown in FIG. 10. In known systems, DPFs tend to have a radial temperature gradient from a center to the outer annular edges, as illustrated by temperature curve 66 in FIG. 10, due to heat transfer loss and due to a distribution of exhaust flow across the DPF. With the mixer assembly 18, however, hotter flow in the outer annular region 62 due to the mixer assembly 18 enabling increased hydrocarbon stratification to the annular region 60 prior to the DOC 20, and reduces the temperature gradient across the downstream DPF 22, as illustrated by the resulting temperature curve 68. Thus, the mixer assembly 18 upstream of the DOC 20 has the effect of increasing the temperature in an outer annular region 70 of the DPF 22. The higher temperature and more uniform radial temperature distribution increases the regeneration efficiency of the DPF 22 by making it easier to burn soot lodged in the outer annular region 70 of the DPF 22.

Alternatively in FIG. 1, the mixer assembly 18 or a second mixer assembly 18 could be placed between the DPF 22 and the SCR catalyst 24, with a reduction catalyst such as urea injected into the flow by the injector 23 between the DPF 22 and the SCR catalyst 24. In such an embodiment, the mixer assembly 18 would be configured to more uniformly distribute the liquid urea across the SCR catalyst 24 to increase efficiency of the SCR catalyst 24. Still further, in embodiments where the component 24 is a lean $No_x$ trap and the injector 23 is a fuel injector to inject hydrocarbons, the second mixer assembly 18 installed between the DPF 22 and the component 24 would be configured to more uniformly distribute the liquid droplets in the gas flow to the component 24.

Figure 4:
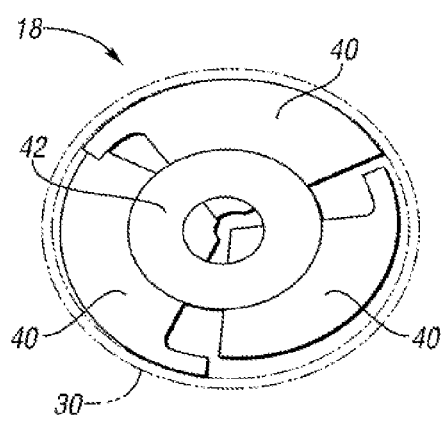
FIG. 4 is a schematic illustration in front view of an impingement element and blades of the mixer assembly of FIG. 2.
Figure 5:
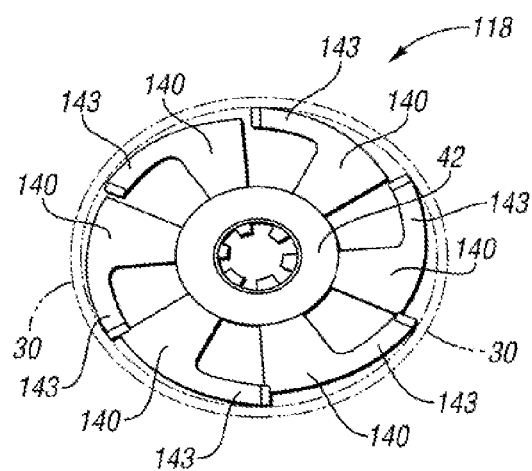
FIG. 5 is a schematic illustration in front view of a portion of a second embodiment of a mixer assembly showing an alternative impingement element and blades for the conduit of FIGS. 1 and 2.
Figure 6:
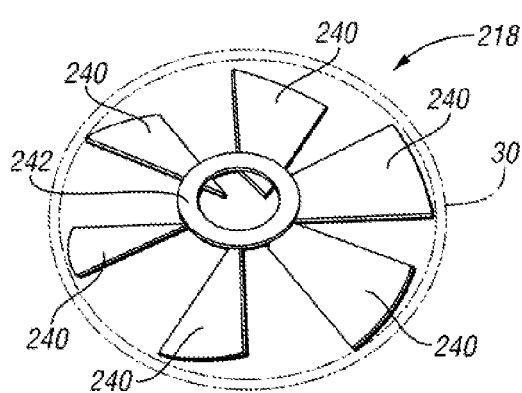
FIG. 6 is a schematic illustration in perspective view of a portion of a third embodiment of a mixer assembly showing an alternative impingement element and blades for the conduit of FIGS. 1 and 2.
Figure 7:
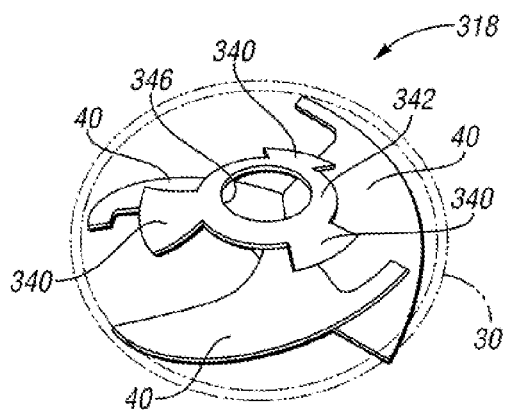
FIG. 7 is a schematic illustration in perspective view of a portion of a fourth embodiment of a mixer assembly showing an alternative impingement element and blades for the conduit of FIGS. 1 and 2.
Figure 8:
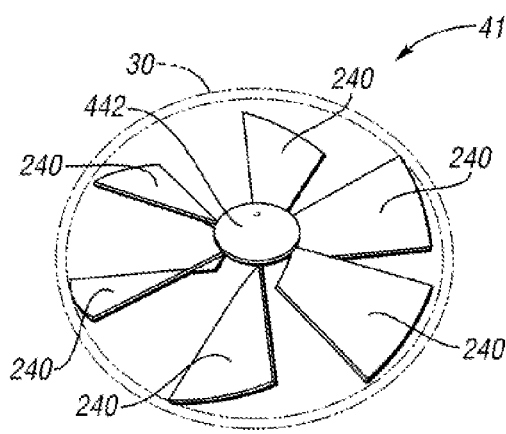
FIG. 8 is a schematic illustration in perspective view of a portion of a fifth embodiment of a mixer assembly showing an alternative impingement element and blades for the conduit of FIGS. 1 and 2.
Figure 9:
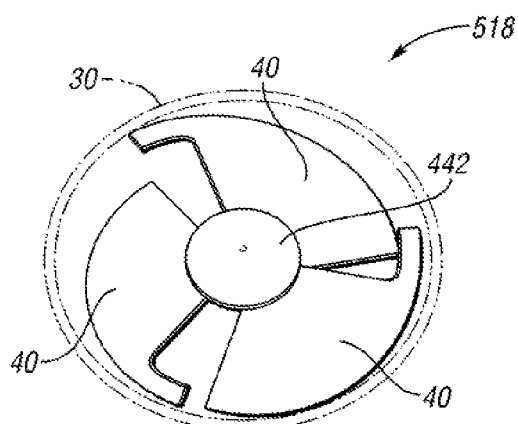
FIG. 9 is a schematic illustration in perspective view of a portion of a sixth embodiment of a mixer assembly showing an alternative impingement element and blades for the conduit of FIGS. 1 and 2.

FIG. 4 shows the mixer assembly 18 with the conduit 30 shown in phantom. FIGS. 5-9 show various alternative embodiments of mixer assemblies that may be used in place of mixer assembly 18 of FIGS. 1-4. FIG. 5 shows a mixer assembly 118 having six blades 140 attached to the impingement element 42. Each of the blades 140 has an outer extension 143 that helps to induce the spiraling, turbulent flow. FIG. 6 shows a mixer assembly 218 having six blades 240 of a slightly simpler shape, without an outer extension, placed within the conduit 30 and attached to a slightly smaller impingement element 242. FIG. 7 shows a mixer assembly 318 having the same blades 40 within the conduit 30 but supporting a different impingement element 342 that has a slightly cone-shaped surface and has a central opening 346. The impingement element 342 has secondary blades 340 that extend from a center portion of the impingement element 342 to further direct liquid and gas flow to the outer annular region of flow within the conduit 30, thus improving disbursement of the liquid droplets to the outer annular region of the DOC 20. FIG. 8 shows a mixer assembly 418 with the same relatively simple blades 240 as in FIG. 6, connected to an impingement element 442 that does not have a central opening. Thus, more liquid droplets are urged to the outer annular flow region of the conduit 30 than in embodiments that have an impingement element with a central opening. Furthermore, greater turbulent flow is created in the annular region for more swirling of the droplets, as no portion of the flow of gas is able to pass through a central region of the conduit 30 without traveling around the impingement element 442 and past the blades 240. FIG. 9 shows a mixer assembly 518 that has the same blades 40 as in FIG. 2, but with the impingement element 442 of FIG. 8 without a central opening.

FIGS. 12-14 illustrate components of an alternative mixer assembly 618 that uses fewer components for ease in manufacturing and assembly. FIG. 12 shows a blade module 640 having two blades 641 connected at an inner peripheral portion 643. The blades 641 each have an outer peripheral portion 645 that extends circumferentially away from the inner peripheral portion 643. As shown in FIGS. 13 and 14, three of the modules 640 are welded together at the outer peripheral portions 645 to form an endless unit 620 that may be inserted into the conduit 30 and welded or otherwise securely connected thereto. Weld areas 647 are indicated with dashed lines.

In FIG. 13 an inner tubular portion 622 helps to separate an axial flow region passing through the inner tubular portion 622 from a turbulent flow region caused by flow forced to swirl past the blades 641. In FIG. 14, an impingement element 642 with a central opening 646 in the form of a plate is positioned on an upstream side of the tubular portion 622 with a central opening. The impingement element 642 helps to break apart liquid droplets in the flow. Alternately, an impingement element with a cone-shaped surface, similar to that of FIG. 2, may be used.

While the best modes for carrying out the claimed invention have been described in detail, those familiar with the art to which this invention relates will recognize various alternative designs and embodiments for practicing the invention within the scope of the appended claims.

The invention claimed is:

1. An assembly comprising:

a hollow conduit having an inner wall and configured for containing a flow of gas and liquid droplets;

multiple spaced blades;

an impingement element;

wherein each of the blades is operatively connected to and extends from the impingement element and is connected to the inner wall of the conduit; wherein the impingement element is upstream of the blades in the flow of gas; wherein the impingement element and the blades are configured to create a preferred distribution of the liquid droplets within the gas flow downstream of the blades within the conduit;

wherein each of the blades is directly connected to an adjacent one of the blades at an inner peripheral portion; wherein each of the blades has an outer peripheral portion directly connected to an outer peripheral portion of another adjacent one of the blades;

wherein the impingement element has a generally cone-shaped surface facing the flow of gas and tapering radially outward downstream and wherein the impingement element has a generally central opening creating an axial flow region in the flow of gas that is unobstructed by the blades.

2. The assembly of claim 1, wherein each of the blades extends at least partially radially outward from the impingement element within the conduit and has a generally helical shape.

3. The assembly of claim 1, wherein the blades form an endless unit when connected with one another.

4. The assembly of claim 3, wherein the blades are directly connected with one another at the outer peripheral portions by welding.

5. The assembly of claim 1, wherein the impingement element and the blades are configured to direct the liquid droplets toward an outer region of the flow of gas within the conduit.

6. The assembly of claim 1, wherein each of the blades is directly connected to said adjacent one of the blades at the inner peripheral portion and is directly connected to said another adjacent one of the blades at the outer peripheral portion.

7. The assembly of claim 1, wherein the inner wall of the conduit has a constant cylindrical shape from immediately upstream of the mixer assembly to immediately downstream of the mixer assembly.

8. A vehicle system comprising:

a hollow generally cylindrical conduit having an inner wall and configured for containing a flow of gas with liquid droplets;

a mixer assembly having:

interconnected blade modules, each having multiple spaced blades;

an impingement element;

wherein each of the blade modules has two blades, an inner peripheral portion, and two outer peripheral portions, with the two blades connected at opposite ends of the inner peripheral portion; wherein the two outer peripheral portions extend circumferentially from different respective ones of the two blades in opposite circumferential directions such that no outer peripheral portion of any of the interconnected blade modules is directly radially outward of the inner peripheral portion; wherein each of the blades is twisted from the inner peripheral portion to the outer peripheral portion extending from the blade; wherein each of the blades is operatively connected to and extends from the impingement element and is connected to the inner wall of the conduit; wherein the inner wall of the conduit has a constant cylindrical shape from immediately upstream of the mixer assembly to immediately downstream of the mixer assembly; wherein the impingement element is upstream of the blades in the flow of gas to thereby deflect the liquid droplets and affect the flow of gas within the conduit; and a vehicle component operatively connected to the conduit downstream of the mixer assembly and operable to process the liquid droplets; wherein the mixer assembly is configured to create a desired disbursement of the liquid droplets in the flow of gas to the vehicle component.

9. The vehicle system of claim 8, wherein the vehicle component is a diesel oxidation catalyst, the liquid droplets are hydrocarbon, and the impingement element and the blades are configured to create a generally axial flow along a center region of the flow of gas within the conduit and a swirling flow along the outer region within the conduit, the mixer assembly thereby improving disbursement of the hydrocarbon to an outer annular region within the diesel oxidation catalyst.

10. The vehicle system of claim 9, further comprising a diesel particulate filter downstream of the diesel oxidation catalyst, wherein a radial temperature gradient in the diesel particulate filter is reduced due to the disbursement of the hydrocarbon within the diesel oxidation catalyst, regeneration efficiency of the diesel particulate filter thereby being improved.

11. The vehicle system of claim 8, wherein the vehicle component is a selective catalyst reduction catalyst, the liquid droplets are diesel exhaust fluid, and the mixer assembly improves disbursement of the diesel exhaust fluid within the selective catalyst reduction catalyst.

12. The vehicle system of claim 8, wherein the vehicle component is a trap configured to trap oxides of nitrogen during a lean operating mode, the liquid droplets are hydrocarbon, and the mixer assembly improves disbursement of the hydrocarbon within the trap.

* * * * *